United States Patent [19]

Duval et al.

[11] 4,280,478
[45] Jul. 28, 1981

[54] FREEZE PROTECTION APPARATUS FOR SOLAR COLLECTORS

[76] Inventors: Eugene F. Duval, 432B W. Meadow Dr., Palo Alto, Calif. 94306; David P. Bagshaw, 922 Lathrop Pl., Stanford, Calif. 94305; Michael A. Kast, 15 Bishop La., Menlo Park, Calif. 94025; Gilbert M. Masters, 1450 Mills Ct.; Harry T. Whitehouse, 15 Bishop La., both of Menlo Park, Calif. 94025

[21] Appl. No.: 960,399

[22] Filed: Nov. 13, 1978

[51] Int. Cl.³ .............................................. F24J 3/02
[52] U.S. Cl. .................................. 126/420; 126/422; 60/527; 137/61
[58] Field of Search ............... 126/418, 419, 420, 422, 126/428, 437; 60/527; 237/80; 137/59, 60, 61, 62, 625.69, 625.48

[56] References Cited

U.S. PATENT DOCUMENTS

| | | | |
|---|---|---|---|
| 1,875,513 | 9/1932 | Smith | 137/61 |
| 3,317,135 | 5/1967 | Feinberg | 60/527 |
| 4,044,754 | 8/1977 | Cronin et al. | 126/420 |
| 4,061,132 | 12/1977 | Ashton et al. | 126/419 |
| 4,119,087 | 10/1978 | Cook | 126/420 |

Primary Examiner—Samuel Scott
Assistant Examiner—Lee E. Barrett

Attorney, Agent, or Firm—Townsend and Townsend

[57] ABSTRACT

A freeze protection system allows the working fluid contained in the communicating tubes of the solar collector to drain from both the input and output tubes of the collector when a first predetermined temperature of the working fluid is detected and to fill the collector via both the input and output tubes when a second predetermined temperature is detected. The invention includes valve mechanisms, of the spool valve variety, that communicate the working fluid to be heated to the collector and therefrom to a storage tank, a valve actuator and a sensor. The actuator moves a valve element from a first position for communicating working fluid to be heated from a source to the input tube of the collector and for communicating heated working fluid from the output tube of the collector to a storage facility to a second position for interrupting fluid communication from the source to the collector and for communicating both the input and output tubes of the collector to a drainpipe—draining the collector of working fluid—when the first predetermined temperature level is detected by the sensor. Upon detection of the second predetermined temperature level the sensor causes the actuator to return the valve element to the first position via an intermediate position that closes the drainpipe and temporarily communicates the working fluid to both the input and output tubes of the collector.

9 Claims, 4 Drawing Figures

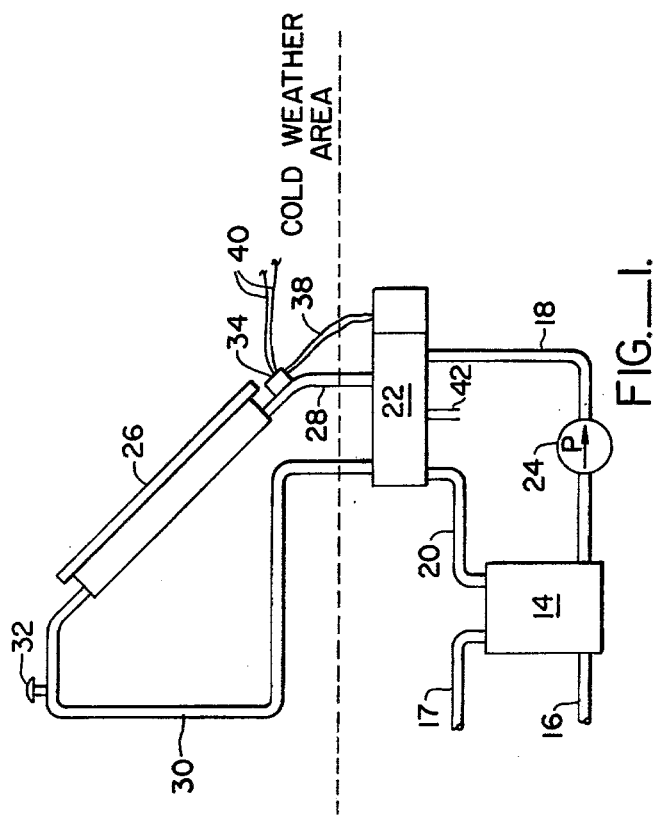
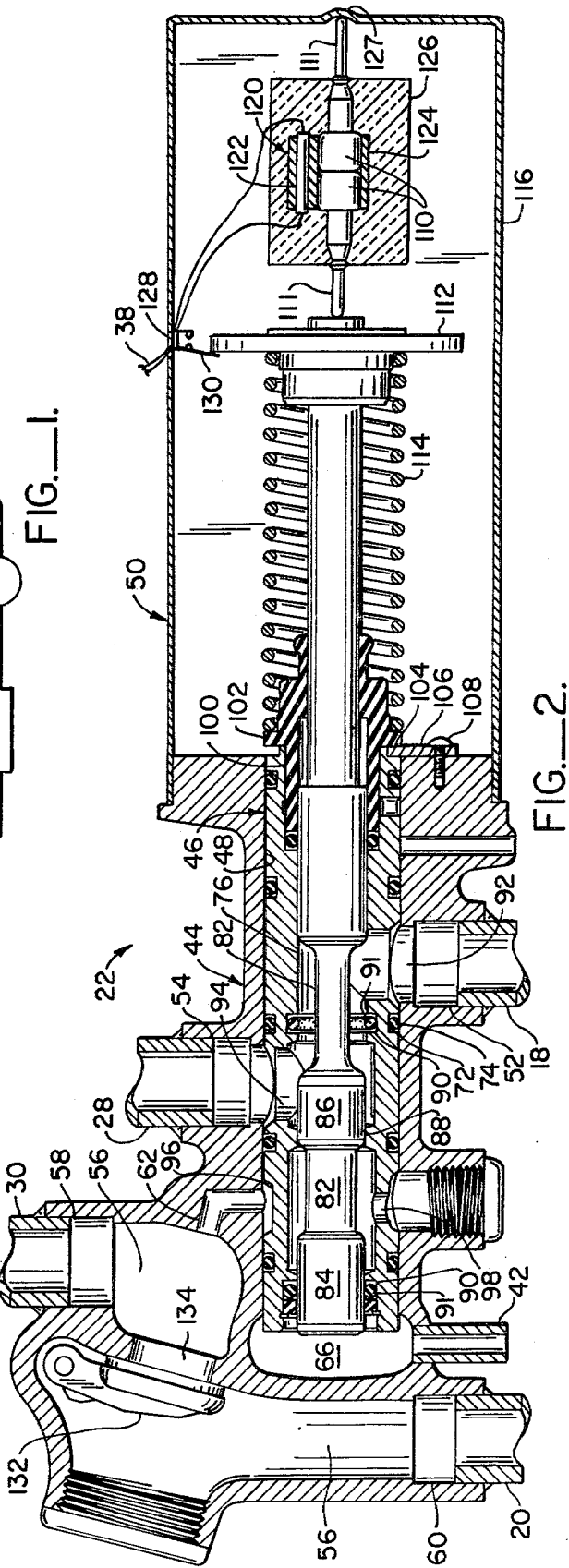

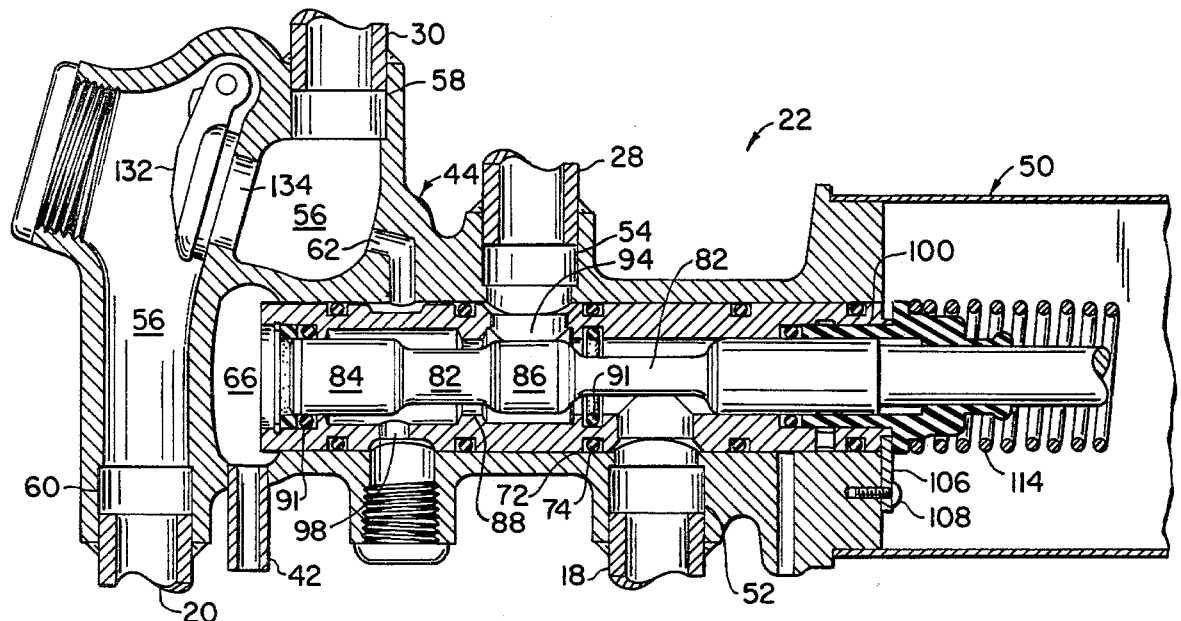
FIG._3.
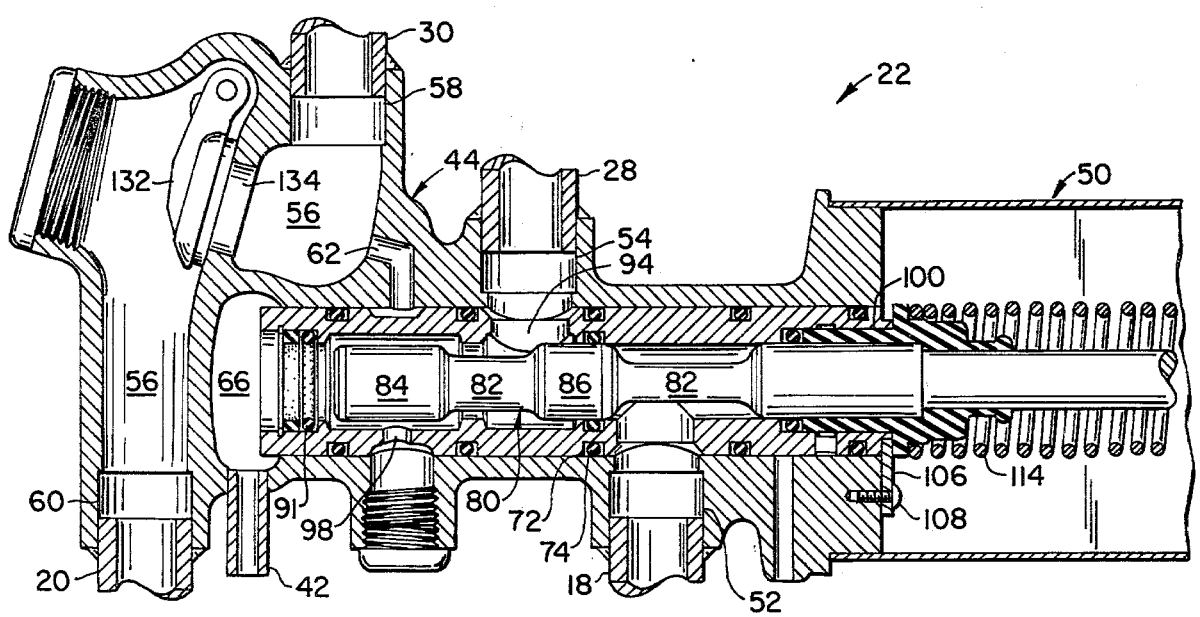
FIG._4.

FREEZE PROTECTION APPARATUS FOR SOLAR COLLECTORS

This invention relates to apparatus for draining the working fluid from solar collectors to avert freezing and consequent freeze damage and particularly to a freeze protection valve operable from a thermostatic actuator.

BACKGROUND OF THE INVENTION

The recent and urgent need to conserve fossil fuels for future feed stocks of petrochemicals is only one reason why the physical processes whereby space heating, water heating and the like from limitless resources like the sun have received so much recent popular attention. For example, space heating utilizing solar energy flat-plate collectors are presently enjoying an ever-increasing use. Typical solar collector systems utilize a flat-plate collector containing a metallic plate painted black, with one or two glass covers. The sides and bottom of the collector act to insulate the collector plate. Solar energy is transmitted through the glass and a significant part of that reaching the metallic plate—about 90 percent—is absorbed by the plate, increasing its temperature. The absorbed energy is, in turn, transferred to a working fluid—sometimes air or a liquid which is preferably (but not always) water.

If the working fluid is water, it is passed through tubes attached to the metallic plate. Water to be heated is pumped from a source to the tubing of the solar collector where the plate-absorbed energy is transferred thereto, with the water acting as the thermal energy storage material for the system. The heated water is then returned to a storage tank where it remains until drawn upon for space heating or used directly as a potable (hot) water supply.

While such solar collector systems enjoy widespread use, they are not without certain disadvantages. One of the more important and debilitating problems involves the situation that can occur when the ambient temperature of the environment in which the solar collector is located drops to or below the freezing point of the working fluid. When this occurs, the expansion of the frozen working fluid (water, for example) can severely damage the communicating pipes and tubing of the solar collector and system.

Various solutions to overcoming this problem have heretofore been proposed and used to some advantage—but not without concomitant disadvantages. For example, air may be used as the working fluid of the solar collector system. However, this requires a second energy transfer in order to heat water for home consumption. Moreover, in addition to being a poor energy storage material, the use of air requires a relatively high blower power for circulation and entails using bulkier ducts and flow passages.

Another solution contemplates use of an antifreeze mixture as the working fluid of sufficient concentration to preclude freezing under the most severe weather conditions reasonably expected in the locale in which the solar collector system is being used. Unfortunately, this solution also has a number of drawbacks. The antifreeze mixture can be expensive and subject to frequent replacement. Moreover, the longevity of many antifreeze chemicals is tied to the maximum surface temperature experienced. For example, propylene glycol cannot be used where temperatures may exceed 300° F., a value which can easily be reached and exceeded by many presently known collectors under no flow or stagnation conditions. Thus, a working fluid including propylene glycol may avoid freeze damage for only a short period—or until the working temperatures seriously mitigate the (freeze protection) usefulness of the mixture. Further, an additional energy transfer must be made via a heat exchanger in order to isolate the antifreeze mixture from space heating or domestic water heating applications. The heat exchanger feature typically requires specialized and costly equipment (e.g., heat exchange bundle, expansion tank, secondary pressure relief, antifreeze solution).

Another method of protecting solar collector systems from freeze damage, and one to which this invention is directed, involves draining the collector array when freezing or near freezing conditions are detected. This technique (typically referred to as a "drain-down" technique) requires the collector array to be designed with suitable provisions for gravity drainage and air control for proper draining of the array and subsequent refilling. A number of advantages are obtained by this method over those discussed above. For example, if water is the working fluid (as it usually is), the need for heat exchanger equipment and antifreeze chemical treatment is avoided since the water can be circulated through the collector array for heating and used directly.

Solar collector systems utilizing this latter approach to freeze protection typically feature electromechanical (e.g., solenoid) actuated valve in combination with a temperature sensing device to monitor the working fluid (water) contained in the collector array. When the temperature of working fluid in the collector drops to a first predetermined level, the sensor interrupts electrical current to the valve actuator, causing the actuator to interrupt communication of the water to and from the storage tank and open a drain path for water contained in the array so that it may drain from the array before it freezes. When the ambient temperature rises to a second predetermined level—above the first—the sensor again communicates electrical current to the actuator to close the drain path and reopen communication between the array and the storage tank or other facility. Examples of this type of system may be seen in U.S. Pat. No. 3,812,872 and 4,044,754.

While this latter technique may be advantageous in many respects, it is not without certain undesirable difficulties. For example, valve malfunctions frequently occur due to particle contamination in flow and/or control ports. Such contamination will cause the valve to stick and fail to provide the necessary drain and flow control functions when needed. Furthermore, since the actuators are usually of a fast-action type (e.g., the valve is opened or closed in fractions of a second), components of the solar collector system can be severely damaged due to hydraulic surges or water hammering during fill operation.

Moreover, many drain-down schemes employing electromechanically operated valves utilize significant quantities of electrical energy. This problem is magnified by the requirement for "failsafe" draining operation in the event of medium or long-term power outage. To achieve a fail-safe drain-down capability, the apparatus must be preloaded to return to a drain configuration when power is lost. In practice, this requires that certain components be continually energized (e.g., in a standby state). Thus, while the operational period of the solar collection equipment is limited to daylight hours, the drain-down apparatus will require standby power on a twenty-four hour basis. Under these conditions, the electrical energy consumption of conventional electromechanical valves can become significant when compared to the energy savings afforded by the collector array.

Drain-down configurations using electromechanically operated valves are also prone to "false" drain-down cycles caused by momentary power losses on the order of seconds or minutes. Such behavior unnecessarily stresses ancillary drain-down components such as the automatic air vents.

Too, drain-down schemes comprised of discrete electromechanical valves often result in a collector filling operation (after draining) which introduces water to one leg of the collector array only. This is particularly true of systems which incorporate a check valve to both prevent reverse circulation at night and to serve as a positive isolation between the collector array and souce pressure in the drain-down mode. Such a filling procedure frequently leads to the entrapment of air in the communicating lines of the system.

SUMMARY OF THE INVENTION

The present invention provides freeze protection apparatus for a solar collector system that drains the working fluid when the temperature of the fluid contained in the collector array approaches a predetermined level; apparatus that is inexpensive, designed for exceptional long life and avoids many of the problems set forth above.

According to the present invention, therefore, there is provided freeze protection apparatus that includes a valve assembly interposed in the tubing that communicates the working fluid to and from the collector array, an actuator for operating the valve and a temperature monitoring sensor. The valve houses an elongate valve member that is axially cycled by the actuator from a first position to a second position via an intermediate position. When in the first position the valve member forms passages with the valve assembly that communicates the working fluid source to the inlet conduit of the collector array. When in the second position fluid passages are formed that simultaneously communicate the input and output conduits of the collector array to the drainpipe to allow the working fluid to drain from the collector array. The actuator is electrically intercoupled with a temperature sensing device (which can take several forms) so that when the temperature of the working fluid contained in the array drops to a first predetermined level the sensor effects actuation of the valve stem to the second position to drain the collector. When the ambient temperature of the collector array rises to a second (safe) predetermined level, the sensor again effects actuation of the valve assembly. The valve member is moved from the second position back to the first position via the intermediate position that shuts the drain and temporarily forms fluid passages that communicate the fluid supply to both input and outlet conduits of the array. The array is thereby quickly filled in a manner that avoids air being trapped in the fluid lines of the system.

In the preferred embodiment, the valve assembly includes a housing with a cylindrical bore formed therein and a valve cartridge, containing the valve member, removably inserted in the bore. The housing and cartridge have a number of ports formed in each, positioned so that the ports of the housing can be concentrically aligned with those of the cartridge, the ports extending into a throughbore formed in the cartridge. The valve member is essentially of the spool valve variety and is in the shape of an elongate valve stem having cyclindrical, band-like sections of increased diameter (relative to the stem) at spaced locations along the stem. The valve member is axially translatable within the cartridge between the first, intermediate and second positions. Depending upon the position of the valve member, the cylindrical sections engage various annular seals formed in the throughbore of the cartridge to seal off certain fluid passages while other fluid passages are opened or created by channels formed between the sections of the valve member of reduced diameter (e.g., the stem) and the interior of the cartridge. All flow ports are configured to minimize the possibility of particulate entrapment.

The actuator can take several forms, but the preferred embodiment is comprised of two insulated, thermally activated devices which expand upon heating. The expansion of the devices is triggered by a solid-to-liquid phase change which occurs in the 160°–180° F. range. The combined expansion of the two actuating devices is used to axially move the valve member.

The sensor which is positioned on the solar collector array to monitor the working fluid contained therein, electrically couples (either directly or indirectly through appropriate control hardware) an electric current to the heater element of the actuator. When the temperature of the working fluid contained in the collector array drops to a first predetermined level, the sensor causes the electric current to the actuator to be interrupted, causing the thermostatic material to cool, contract and, in turn, the spring moves the valve member from the first position to the second position, permitting the working fluid to drain from the solar collector array.

When the ambient temperature of the collector array rises to a second predetermined level (e.g., a temperature above the freezing point of the working fluid of the system) the sensor will re-apply electric current to the actuator which, in turn, will begin axial translation of the valve member from the second position to the first position.

A number of advantages are achieved by the present invention described herein. First, the particular valve arrangement disclosed allows positive draining of the working fluid from the collector array when the ambient temperature of the array approaches the freezing point of the working fluid. Freeze damage is thereby avoided without having to use a working fluid comprising antifreeze components and the concomitant debilitating features thereof.

Further, due to the thermal insulation around the actuator, the energy consumption is very low and the actuator is slow acting. The nature of the actuator assembly is such that its standby power consumption is dramatically lower than that used by comparable electromechanical assemblies. The power consumption is controlled by the amount of thermal insulation around the actuating devices and heating element which supplies energy to the devices. In addition to the lower power consumption, the combined effects of the insulation and heating element give rise to an operational time constant of several minutes.

Valve member movement between the first and second positions is on the order of minutes. Accordingly, the actuator is relatively insensitive to and can "mask" short-term (e.g., seconds or even minutes) power outages. The debilitating and damaging effects of water hammer and other associated surger phenomena usually associated with fast-acting solenoid actuated valve arrangements are thereby avoided. Moreover, this delay feature allows the valve member to slowly traverse the intermediate position (when moving from the second to the first position) wherein the valve member forms fluid passage with the cartridge that communicates the working fluid to both input and output conduits of the collector array. This feature allows the collector array to be filled while avoiding the possibility of air being trapped in the input or output lines thereof.

A further advantage is obtained by using a valve cartridge/valve member assembly that is removably inserted in a housing to form the valve assembly. With the cartridge removed, the respective working fluid lines can be connected to the housing by soldering or the like. With the cartridge removed from the housing, the heat generated by the soldering process will not damage the valve seals (typically a rubberized composition) contained in the cartridge. Further, the cartridge assembly can be easily removed for maintenance without having to tamper with fluid communicating pipes of the system.

For a better understanding of the present invention, together with other and further features and advantages thereof, reference is had to the following description taken in conjunction with the accompanying drawings, the scope of the invention being pointed out in the claims appended hereto.

BRIEF DESCRIPTION OF THE DRAWINGS

FIG. 1 is a diagrammatic view of a solar collector system having the freeze protection mechanism of the present invention embodied therein;

FIG. 2 is a sectional side view illustrating, in detail, the valve apparatus used in the present invention, showing the valve member situated in the first position for communicating cold waterline of the system to the input line of the collector array; and FIGS. 3 and 4 are fragmentary views, partly in section, of the valve of FIG. 2, showing the valve member in an intermediate and a second position, respectively.

DETAILED DESCRIPTION OF THE DRAWINGS

Turning now to the drawings, which illustrate one embodiment of the present invention, there is seen in FIG. 1 the diagram of a typical solar collector system for heating a working fluid. For the purposes of simplifying the description of the present invention, it will be assumed that the working fluid is water, although it should be evident that a number of other types of working fluid can be utilized. Thus, a typical solar collector system for heating the water includes a storage tank 14 with waterline 16 for communicating water to be heated from such sources as the city water supply or the like and line 17 for communicating warmed water from the storage tank for utilization. Cold waterline 18 and warm waterline 20 establish fluid communication between the storage tank 14 and valve mechanism 22. A fluid pump 24 is inserted in the cold waterline 18 to maintain flow of the water through the system.

A valve mechanism 22 is also connected to collector array 26 via collector input and output lines 28 and 30. Mounted to the output line 30 is an automatic air vent 32. A sensor 34 is mounted to the collector array 26 to monitor the temperature of the working fluid contained in the array. Electric wires 38 communicate electric current, received via input terminals 40 from a source (not shown), to the valve mechanism for operation thereof, as will be more fully described below.

Generally, solar collection systems of the type illustrated accept water to be heated via line 16 from a potable water supply or source (not shown) and circulate that water through the collector array 26 and to tank 14 where it is stored for subsequent transmission via line 17 to whatever utilization means may be involved. Thus, water to be warmed is pumped from the storage tank 14 by pump 24 via cold waterline 18, through valve mechanism 22 to collector input line 28. The water is circulated through the collector array 26 where it is heated and returned to storage tank 14 via the collector output line 30, valve mechanism 22 and warm waterline 20. The warmed water remains in storage tank 14 until used or until it requires further heating. In the latter case the water is again circulated through the collector array 26 and returned to storage tank 14.

The above-described operation of the solar collector system of FIG. 1 is typical of many, if not all, similar systems in use today. If, however, the temperature of the water contained in collector array 26 approaches its freezing point, action must be taken to avoid having the water freeze in and thereby damage the array. It is this problem to which the present invention is directed. Thus, sensor 34 monitors the temperature of the water in the array 26 and, when the water temperature drops to a first predetermined level, acts to cause valve mechanism 22 to interrupt communication between cold waterline 18 and collector input 28. The valve mechanism 22 then communicates both the input and output lines 28 and 30 respectively, of the collector array to a drainpipe 42, permitting water to gravity drain from the collector array. When the ambient temperature of the collector array 26 rises to a second predetermined level, valve mechanism 22, upon command from sensor 34, closes drainpipe 42 and temporarily communicates cold waterline 18 to both collector input and output lines 28 and 30 to fill the collector array. When filled, water flow from cold waterline 18 to the collector output line 30 is interrupted.

Turning now to FIGS. 2 through 4, the specific embodiment of valve mechanism 22 presently ccontemplated may now be described. As shown, valve mechanism 22 includes housing 44, with valve cartridge 46 inserted in an elongate, generally cylindrical bore 48 formed in the housing, and actuator 50. Formed in the housing 44 and extending into bore 48 are first and second ports 52 and 54, respectively. Port 52 accepts and is connected to cold waterline 18, while the second port 54 is connected to input line 28 of the collector array 26. Also formed in housing 44 is fluid duct 56, having third and fourth ports 58 and 60, respectively. As illustrated, third port 58 of housing 44 is connected to output line 30 of the collector array while the fourth port has connected thereto warm waterline 20 of the system. A fluid passage 62 communicates the duct 56 to bore 48 of the housing.

Formed at one end of bore 48 is a drain chamber 66 with drainpipe 42 extending through the housing and into the drain chamber.

Bore 48 of the valve housing removably holds valve cartridge 46, which is sized and configured to fit snugly within the bore, yet be easily removed therfrom. Valve cartridge 46 is generally cylindrically shaped with a number of circumferential recesses 72 formed in the outer surface thereof that hold annular seals 74. Extending axially through the cartridge 46 is a cylindrical throughbore 76 which holds valve member 80. Valve member 80 is formed from an elongate stem 82 having cylindrical spool sections 84 and 86 formed thereon. As can be seen, spool sections 84, 86 are of a diameter greater than that of the stem 82. Formed on the interior surface of the throughbore 76 and oriented circumferentially is annular ring 88 which is dimensioned and configured to establish sealing engagement with the spool section 86. Throughbore 76 is also provided with circumferential recesses 90, each holding an annular seal 91 therein.

A pair of orifices 92 and 94 are formed in valve cartridge 46 to extend into the throughbore 76. The orifices are positioned so that the cartridge is appropriately inserted and located within bore 48 of housing 44, the orifices 92 and 94 are concentrically aligned with ports 52 and 54, respectively. Finally, formed circumferentially about the outer surface of the cartridge 46 is a fluid channel 96 which, with aperture 98 extending into the throughbore 76, forms a passage that communicates fluid duct 56 to the throughbore 76 of the cartridge via passage 62, channel 96 and aperture 98.

Force-fitted in the outer end of cartridge 46 is main seal 100 having a radially extending flange 102 positioned to form a clearance 104 for accepting key 106 to removably hold the cartridge within the housing. The key is attached to the housing by any appropriate fastening apparatus such as, for example, a bolt 108. Attached to the housing-cartridge combination for axial translation of valve member 80 is actuator 50 which includes two back-to-back thermostatic actuation elements 110, 110, pressure plate 112 and helical spring 114. Pressure plate 112 is mounted to the exterior end of valve member 80 with helical spring 114 mounted about the external portion of the valve member and between the plate and flange 102 of main seal 100 so as to bias the valve members axially toward thermostatic actuator element 110. A cap 116 encloses the components of actuator 50.

The thermostatic actuator elements 110, 110 are of a type which transforms temperature changes into useful mechanical energy in the form of piston movement. Each thermostatic actuator element 110 contains a specially formulated material with carefully controlled thermal expansion property to produce a volumetric expansion. Thus, when heated, each actuator element 110 converts expansion of the material contained into axial movement of piston 111. As illustrated in FIG. 2, actuator elements 110, 110 are mounted between cap 116 and pressure plate 112 back-to-back so that as the heated material expands, piston 111 causes concomitant axial translation of the valve element 80 against the bias of spring 114.

Such thermostatic actuating elements are readily available on the market today and it is presently contemplated that a thermostatic actuator sold by the Fulton Sylphon Division of Robertshaw Controls Company of Knoxville, Tennessee will be used; the specific actuator in mind is designated by the Robertshaw Controls Company by part number 98067-A and sold under the "Powerpill" trademark, a registered trademark of Robertshaw Controls Company.

To effect the required temperature change that is transformed into mechanical energy by actuator elements 110, 110, heater element 120 is provided. Heater element 120 is shown as including an axial lead resistor 122 mounted in an aluminum block 124. Also mounted in block 124 are the actuator elements 110, 110. Surrounding the heating element 120 is insulation 126. Both the resistor 122 and actuator elements 110, 110 should be snugly held by block 124 to ensure good thermal conductivity therebetween. The actuating elements/heater element/insulation combination is held in place by an appropriate means, together with dimple 127, to maintain the relative axial alignment of the combination.

The nature of the thermostatic actuating elements described herein is such that the power consumed by the element during its on or quiescent state can be lowered through the use of thermal insulation; ergo, the use of insulation 126. By insulating the heater and actuating elements, the power consumed by each actuating element during its quiescent state is dramatically lower than that of comparable electromechanical assemblies.

Electric current is communicated to resistor 122, usually from the household supply (not shown), via electrical lines 38 from, as described above, sensor 34. In this way, electric current is transformed into heat by resistor 122 to warm actuator elements 110, 110 (via aluminum block 124) and ultimately effect movement of valve element 80.

Micro-switch 128 is mounted proximate and in the path of travel of pressure plate 112. When the thermostatic actuating element has moved valve element 80 a sufficient distance to place it in a first position (the position illustrated in FIG. 2), the outer periphery of pressure plate 112 comes into contact with and engages arm 130 of the micro-switch to open a set of normally closed contact points. This, in turn, breaks communication of electrical current to heater element 120. The material in actuating elements 110, 110 cools, contracts and spring 114 biases pressure plate 112 away from the housing 44. Arm 130 is disengaged, the contacts of micro-switch 128 close and electric current is re-established to heater element 120 and the cycle begins anew. In this manner valve member 80 is subjected to a slight axial oscillation which, it is believed, prevents valve seals from causing excessively high break-away friction forces, a common problem with elastomeric seals.

Having described the construction of the valve assembly contemplated for use, its function and operation can now be described in connection with protecting the solar collector array from freeze damage. First, assume normal operating conditions and that the temperature of the water contained in the array is above its freezing point. Accordingly, electric current is supplied to the heater element 120 of the thermostatic actuator via sensor 34 to cause the actuator to axially translate valve element 80 to a first position illustrated in FIG. 2. As can be seen, the spool section 86 of the valve element is placed in sealing engagement with annular seal ring 88. With the valve element so positioned, the reduced portions of the valve element (i.e., stem 82) forms fluid passage with throughbore 76 of cartridge 46 that, together with concentrically aligned port-aperture combinations 52, 92 and 54, 94, respectively, establish communication between cold waterline 18 and collector input line 28. Warmed water is returned from the collector array to valve mechanism 22 by output line 30. The water passes through the valve mechanism via duct 56 to warm waterline 20 which communicates the warmed water to storage tank 14 (FIG. 1).

In order to prevent thermosyphoning of warmed water from the storage tank and back through duct 56, a gravity-operated check valve 132 is pivotally mounted within duct 56. During periods of no fluid flow through the collector, check valve 132 closes upon duct orifice 134 and prevents thermosyphon action. When circulation of water in the system 10 (FIG. 1) is resumed by pump 24, the pressure of the fluid will be sufficient to work against the gravity pull upon check valve 132 to open it and allow water flow to commence through duct 56.

In the event the temperature of the water approaches its freezing point, sensor 34 (which can be, for example, a precision thermostatic switch such as that manufactured by Texas Instruments and designated by part number 4344-176) interrrupts the electric current communicated to actuator 50 via electrical lines 38 when the water temperature drops to a first predetermined level. Thus, when the first predetermined level is reached (usually set at a few degrees above the freezing point of water) electric current is removed from heater element 120 and the material contained in the thermostatic actuating elements 110 being to cool and contract. The bias of helical spring 114 begins to take command to move valve element 80 axially out of the cartridge-housing assembly.

Because of the particular features of the thermostatic actuator presently contemplated, the movement of the valve element from its first position (FIG. 2), through an intermediate position (FIG. 3), to its second position (FIG. 4) is completed in approximately five or six minutes. This time delay is, of course, a function of the particular actuator element selected, the insulation of the actuator element and the bias loading applied by helical spring 114. While valve element 80 traverses the initial portions of the intermediate position, there exists a short period during which sealing engagement between the valve element and the seals 88, 91 which border orifice 94, is broken. This allows pressurized water to flow through throughbore 76, resulting in a flushing action that serves to clear out any residual debris that may have collected within the cartridge; such debris, if left to accumulate, could damage seals 88 and 91 of the cartridge-valve element assembly.

If electric current remains interrupted to heater element 120 the second position (FIG. 4) is reached, placing spool section 86 in sealing engagement with annular seal 90 of the cartridge. This position effectively closes cold waterline 18. Cocomitantly, both the collector array input and output lines 28 and 30 are now in fluid communication with drainpipe 42. As FIG. 4 illustrates, input line 28 of the solar collector is communicated to the drainpipe 42 via the channel formed between reduced section (e.g., stem 82) of the valve element 80 (between spool sections 84 and 86) and seal 88, around spool section 84 and into drain chamber 66. Similarly, output line 30 of the solar collector is communicated to the drain chamber via duct 56, passage 62, annular channel 96 (about the cartridge 46), aperture 98, and into drain chamber 66. Thus, both the input and output lines of the solar collector are allowed to drain simultaneously.

Once the collector array 26 has been drained of water, it is protected from freeze damage. If the ambient temperature collector subsequently returns to a safe level, the system 10 may again be put into operation. Accordingly, sensor 34 causes electrical communication to be re-established between input terminals 40 and heater element 120. The actuating elements 110, 110 are warmed, the material contained therein expands and commences axial translation of the valve element 80 from the second position (FIG. 4) to the first position (FIG. 2). However, because of the inherent delay referred to above, the valve element 80 again moves through the intermediate position (FIG. 3) with some delay and a number of further advantages. As FIG. 3 illustrates, while in this intermediate position (and moving toward the first position) cold waterline 18 is placed in communication with both input and output pipes 28 and 30 of the collector array. Accordingly, the collector array is filled via both the input and output lines simultaneously, forcing the air in the lines 28 and 30 upward where it is vented by air vent 32.

Housing 44, cartridge 46, and cap 116 are preferably manufactured from a material having relatively good heat conductive properties, such as brass or the like. The reason for this resides in the fact that the power consumption of the actuator is tied to the valve's operating temperature in a beneficial way. When operating, the valve mechanism is warmed by the heated water passing therethrough (e.g., through duct 56) from the collector to the storage facility. In turn, heat is transferred to the housing, cartridge and cap which helps warm thermostatic actuating element 120. Thus, the electrical energy requirement for holding the actuating element in an energized state is reduced.

While the above provides a full and complete disclosure of the preferred embodiments of the invention, various modifications, alternate constructions and equivalents may be employed without departing from the true spirit and scope of the invention. Therefore, the above description and illustrations should not be construed as limiting the scope of the invention, which is defined by the appended claims.

What is claimed is:

1. In a system for warming a fluid by solar energy, the system including a solar collector array having an input conduit for receiving the fluid and an output conduit for discharging the fluid, a reservoir having an output line for supplying the fluid to be warmed and an input line for receiving fluid warmed by the solar collector array, and means for circulating the fluid from the reservoir, through the solar collector array, and back to the reservoir, freeze protection apparatus for draining the fluid from the solar collector array when the fluid within the array drops to a predetermined temperature, the apparatus comprising:

valve means interconnecting the reservoir input and output lines to the input and output conduits of the solar collector array, the valve means including a drain port and a valve element that is movable between:
 (a) a first position for establishing mutually exclusive fluid communication between the reservoir output line and the input conduit and the output conduit and the reservoir input line, respectively,
 (b) an intermediate position for establishing fluid communication between the reservoir output line and the input and output conduits simultaneously, and
 (c) a second position for terminating fluid communication between the reservoir output line and the input and output conduits and for communicating the input and output conduits to the drain port, whereby fluid is drained from the solar collector array; a source of an electric current;

thermally activated actuator means, including heater means coupled to the valve means for moving the valve element from the second position, through the intermediate position to the first position when the electric current is applied to said heater means and to move the valve member from the first position to the second position when the electric current is removed therefrom; and sensor means communicating the electric current to the actuator means for monitoring the temperature of the fluid contained in the solar collector array, the sensing means being operable to interrupt communication of the electric current to the actuator when the termperature being monitored reaches said predetermined temperature.

2. The apparatus of claim 1, wherein the actuator means includes bias means for biasing the valve member to the second position.

3. The apparatus of claim 2, wherein the bias means is a helical spring.

4. The protection apparatus of claim 1, wherein the actuator means includes a housing fabricated from a heat conductive material.

5. The apparatus of claim 1, wherein the valve means includes a check valve having a flap member pivotally mounted in the fluid path established between the output conduit of the collector array and the reservoir when the valve member is in the first position, the check valve being operable by gravity to permit one-way fluid flow and to prevent thermosyphon.

6. The apparatus of claim 1, including switch means being operable to interrupt electrical communication between the sensor means and the actuator when the valve member reaches the first position and to re-establish electrical communication therebetween when the valve member begins to move away from the first position, thereby causing a slight oscillation of the valve member while in said first position.

7. The apparatus of claim 6, including insulating means for insulating the actuating and heating elements.

8. Freeze protection apparatus operable from a source of electric current for draining a fluid from a solar collector array, the apparatus comprising:

valve means interconnecting the solar collector array to a fluid reservoir, the valve means including a drain port and a valve element that is movable between a first position for establishing fluid communication between the fluid reservoir and the solar collector array and a second position terminating the fluid communication therebetween the inlet and outlet conduits and the reservoir and for communicating the solar collector to the drain port;

thermosensitive actuator means coupled to the valve means for moving the valve element from the second position to the first position when the electric current is applied thereto and to move the valve element from the first position to the second position when the electric current is removed therefrom;

sensor means communicating the electric current to the actuator means for monitoring the temperature of the fluid contained in the solar collector array, the sensing means being operable to interrupt communication of the electric current to the actuator when the temperature being monitored obtains a first predetermined level; and switch means interconnecting said sensor means and said actuator means and being operable to interrupt electrical communication between the sensor means and the actuator means when the valve member reaches the first position and to reestablish electrical communication therebetween when the valve member begins to move away from the first position, thereby causing a slight oscillation of the valve member while in said first position.

9. In a system for warming a fluid by solar energy, the system including a solar collector array having an input conduit for receiving the fluid and an output conduit for discharging the fluid, a reservoir having an output line for supplying the fluid to be warmed and an input line for receiving fluid warmed by the solar collector array, means for circulating the fluid from the reservoir, through the solar collector array, and back to the reservoir, and a source of electric current, freeze protection apparatus for draining the fluid from the solar collector array when the fluid within the array drops to a predetermined temperature, the apparatus comprising:

valve means interconnecting the reservoir input and output lines to the input and output conduits of the solar collector array, the valve means including a drain port and a valve element that is movable between:
  (a) a first position for establishing mutually exclusive fluid communication between the reservoir output line and the input conduit and the output conduit and the reservoir input line, respectively,
  (b) an intermediate position for establishing fluid communication between the reservoir output line and the input and output conduits simultaneously, and
  (c) a second position for terminating fluid communication between the reservoir output line and the input and output conduits and for communicating the input and output conduits to the drain port, whereby fluid is drained from the solar collector array;

thermally activated actuator means coupled to the valve means for moving the valve element from the second position, through the intermediate position, to the first position when the electric current is applied thereto and to move the valve member from the first position to the second position when the electric current is removed therefrom;

sensor means communicating the electric current to the actuator means for monitoring the temperature of the fluid contained in the solar collector array, the sensing means being operable to interrupt communication of the electric current to the actuator when the temperature being monitored reaches said predetermined temperature; and switch means being operable to interrupt electrical communication between the sensor means and the actuator means when the valve member reaches the first position to restablish electrical communication therebetween when the valve member begins to move away from the first position, thereby causing a slight oscillation of the valve member while in said first position.

* * * * *